United States Patent [19]

Poggemiller et al.

[11] 4,422,511
[45] Dec. 27, 1983

[54] HYDRAULIC RESET FOR TILLAGE AND SEEDING EQUIPMENT

[76] Inventors: Erhard Poggemiller, Box 128, Luseland, Saskatchewan, Canada, S0L 2A0; Ralph Sweet, Box 3, Forgan, Saskatchewan, Canada, S0L 1G0

[21] Appl. No.: 391,457

[22] Filed: Jun. 23, 1982

Related U.S. Application Data

[63] Continuation-in-part of Ser. No. 25,399, Mar. 30, 1979, Pat. No. 4,353,423, which is a continuation-in-part of Ser. No. 835,049, Sep. 21, 1977, abandoned.

[51] Int. Cl.³ .................. A01B 61/04; A01B 63/32
[52] U.S. Cl. .................. 172/260.5; 172/464; 172/572; 111/87
[58] Field of Search ............ 172/260.5, 464, 482, 172/491, 484, 462, 572, 573, 462, 500; 111/85, 87

[56] References Cited

U.S. PATENT DOCUMENTS

| | | | |
|---|---|---|---|
| 2,756,662 | 7/1956 | Christensen | 172/491 |
| 3,439,749 | 4/1969 | Olsson | 172/572 |
| 3,561,541 | 2/1971 | Woelfel | 172/260.5 |
| 3,565,180 | 2/1971 | Arnold | 172/260.5 |
| 3,752,092 | 8/1973 | Vinyard | 172/260.5 |
| 4,044,697 | 8/1977 | Swanson | 172/464 |
| 4,116,140 | 9/1978 | Anderson | 172/572 |

*Primary Examiner*—Richard J. Johnson
*Attorney, Agent, or Firm*—Stanley G. Ade

[57] ABSTRACT

An hydraulic ram is situated between the tillage tool and the frame and is normally fully extended and acts as a rigid link. The ram has a predetermined and adjustable pressure so that if an obstruction is encountered by the tool, it only retracts when the preset pressure is exceeded and then returns to the fully extended position as soon as the obstruction is passed. It can be used on machines such as discers, hoe drills, press drills or any ground working implement which includes tillage tools which are pivoted to the frame and which do not engage the ground by raising and lowering the frame. An adjustable pressure reducing valve is situated in the hydraulic line extending to the ram and senses the pressure downstream of the valve rather than the pressure upstream as is usual.

28 Claims, 7 Drawing Figures

HYDRAULIC RESET FOR TILLAGE AND SEEDING EQUIPMENT

BACKGROUND OF THE INVENTION

This invention relates to new and useful improvement in resetting devices for agricultural implements, particularly discers, hoe drills, press drills or any ground working tool which has tilling tools engaged upon a pivot point which rotates relative to the frame and which does not engage the ground by raising or lowering the frame to the ground and constitutes a continuation-in-part application of U.S. application Ser. No. 25,399 filed Mar. 30, 1979 now U.S. Pat. 4,353,423 which in turn is a continuation-in-partapplication of U.S. application Ser. No. 835,049 filed Sept. 21, 1977, now abandoned.

Conventionally, such machines have had adjustable tension applied to them by means of compression springs or the like and these springs allow for a reasonable amount of give on the compression, to trip over solid obstacles such as stones, rocks, roots or the like.

Unfortunately, springs have very little resistance at the beginning of their travel and this resistance increases as the spring is extended or compressed.

Designs of tillage tools with springs, such as discers, usually have several gangs linked together rigidly and these are then put under tension by a spring. These tend to ridge the ground because of uneven soil densities and the inability of a spring to apply enough tension to penetrate relatively hard ground and yet have enough compression left so that they trip in case an obstacle is encountered. Furthermore, conventional designs incorporating springs, leaves utilled soil under straw rows because of the inability of the spring to provide sufficient penetration to penetrate through the straw rows and till the soil and again have enough movement left for tripping action in case of an obstacle being encountered.

This kind of action causes soil ridging and poor tillage as well as poor crop growth if the seed is put into the ground at an uneven depth. Under certain circumstances the seed will not grow at all if it is placed upon a straw row where the furrow openers have not penetrated the soil.

Another disadvantage of conventional spring is that when travelling in field conditions at working speeds, the spring tends to bounce over an obstacle such as a rock and does not apply the same pressure at all times while passing over the obstacle. It will re-engage into the ground at a point some distance after the obstacle due to the time lag in spring expansion and recoil and this leaves untilled soil. Furthermore, during a seeding operation it also tends to leave a relatively high weed count.

Attempts have been made to incorporate an hydraulic ram instead of springs and an example of this is shown in Arnold's U.S. Pat. No: 3,481,407. However, this disclosure teaches the use of conventional relief valve in the circuit which senses pressure upstream from the valve so that it must be set at a pressure higher than the pump compensator setting so that the reset pressure cannot be controlled below this pump setting which normally is relatively high.

SUMMARY OF THE INVENTION

This invention overcomes these disadvantages by providing an hydraulic action inasmuch as a single acting hydraulic ram is used in place of a spring with means to control the pressure of the ram. An adjustable pressure reducing valve is incorporated so that the pressure acting upon ram is adjusted to a pressure below the setting of the main variable displacement pump (and the main setting ram) thus giving the desired control characteristics.

Under these circumstances, the ram operates at a completely extended position at all times unless an obstruction is reached. The pressure is adjusted by means of an adjustable valve in the pressure reducing valve, according to the soil density. With the preset pressure set according to soil density, all of the working tools or disc gangs would be at approximately the same depth thereby eliminating ridging and giving a relatively even seed bed. However, they still retain the full stroke of the ram for tripping action if an obstacle is engaged which causes an excess pressure on the ram above the preset pressure. When this action happens, the same pressure is applied throughout the motion of tripping as the obstacle is passed and thus there is no time lag in expansion and recoil. As a result there are less misses due to the reset action of the ram thereby giving a lower weed count. This same action is also applied when working conditions require the tillage equipment to cut through straw rows.

One aspect of the invention is to provide in an agricultural implement which includes a frame, and a ground engaging tool assembly pivotally supported upon said frame, an hydraulic system including a variable displacement pump, a high pressure line extending from said pump, a main hydraulic ram operatively connected to said high pressure line and to said ground engaging tool assembly for controlling and presetting the depth of penetration of said ground engaging tool assembly; the improvement comprising in combination a resetting ram assembly for said ground engaging tool assembly, operatively extending between said ground engaging tool assembly and said frame, means operatively connecting said resetting ram assembly to the hydraulic system and means to adjust the hydraulic pressure within said resetting ram assembly below pump pressure whereby said resetting ram assembly is normally fully at one end of the stroke thereof until a predetermined pressure upon said ground engaging tool assembly is exceeded, said last mentioned means comprising a pressure reducing valve assembly operatively connected between said high pressure line and said resetting ram assembly to control and sense the pressure downstream of said valve assembly, said ground engaging tool assembly including at least one coulter assembly mounted for pivotal action to said frame, said resetting ram assembly being operatively connected between said main hydraulic ram and said coulter assembly.

Another aspect of the invention is to provide a ground working agricultural implement comprising in combination a frame, a ground engaging tool assembly pivotally supported upon said frame, an hydraulic system including a variable displacement pump, a high pressure line extending from said pump, a main hydraulic ram operatively connected to said high pressure line and to said ground engaging tool assembly for controlling and presetting the depth of penetration of said ground engaging tool assembly; the improvement comprising in combination a resetting ram assembly for said ground engaging tool assembly, operatively extending between said ground engaging tool assembly and said frame, means operatively connecting said resetting ram assembly to the hydraulic system and means to adjust the hydraulic pressure within said resetting ram assembly below pump pressure whereby said resetting ram assembly is normally fully extended until a predetermined pressure upon said ground engaging tool assembly is exceeded, said last mentioned means comprising a pressure reducing valve assembly operatively connected between said high pressure line and said resetting ram assembly to control and sense the pressure downstream of said valve assembly, said ground engaging tool assembly including at least one coulter assembly mounted for pivotal action to said frame, said resetting ram assembly being operatively connected between said main hydraulic ram and said coulter assembly.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
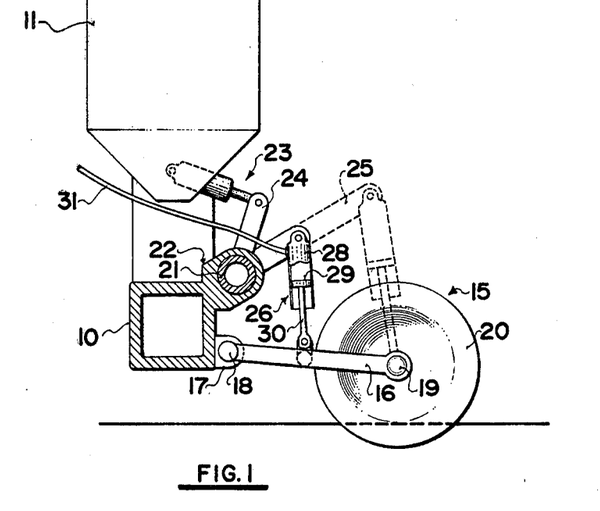
FIG. 1 is a partially schematic, partially sectioned end view of one embodiment of the invention as applied to a discer.
Figures 2, 3:
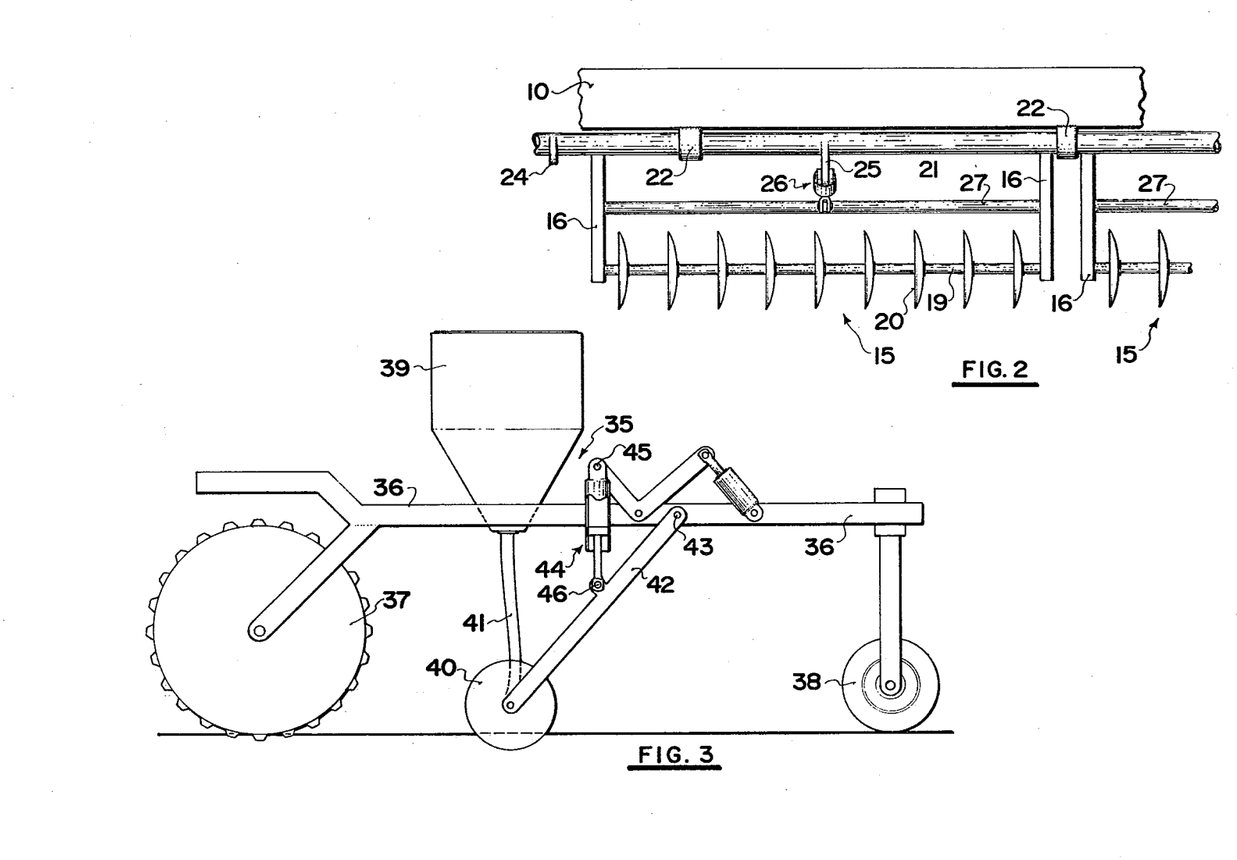
FIG. 2 is a fragmentary top plan view of one disc gang showing one method of securing the reset ram assembly and with the seed box removed for clarity.
FIG. 3 is a schematic side elevation showing the invention applied to a seed drill.

Proceeding therefore to describe the invention in detail, reference should first be made to FIGS. 1 and 2 in which reference character 10 illustrates the main frame of a discer having a seed box 11 supported thereon.

A main hydraulic system (shown in FIG. 4) includes a pump 12, a fluid tank or reservoir 13 and a filter 14. This portion of the hydraulic system is often carried on the tractor which is adapted to pull the implement. However, this is not illustrated in the accompanying drawings.

A plurality of disc gang assemblies collectively designated 15 are pivotally supported from the main frame 10 and in this embodiment, each disc gang is supported by a pair of members 16 pivoted by one end thereof to frame members 17 through pivots 18. These members extend rearwardly of the main frame 10 and include a spindle 19 journalled for rotation between members 16 and carrying a plurality of ground engaging discs 20 thereon, such structure being conventional.

A main rock shaft 21 is supported within pillow blocks 22 at the rear of the main frame 10 and a main hydraulic ram assembly 23 extends between the frame and a lug 24 connected to the rock shaft 21 so that extension and retraction of the main hydraulic ram rotates the rock shaft 21 within the pillow bearings or blocks 22.

Figure 4:
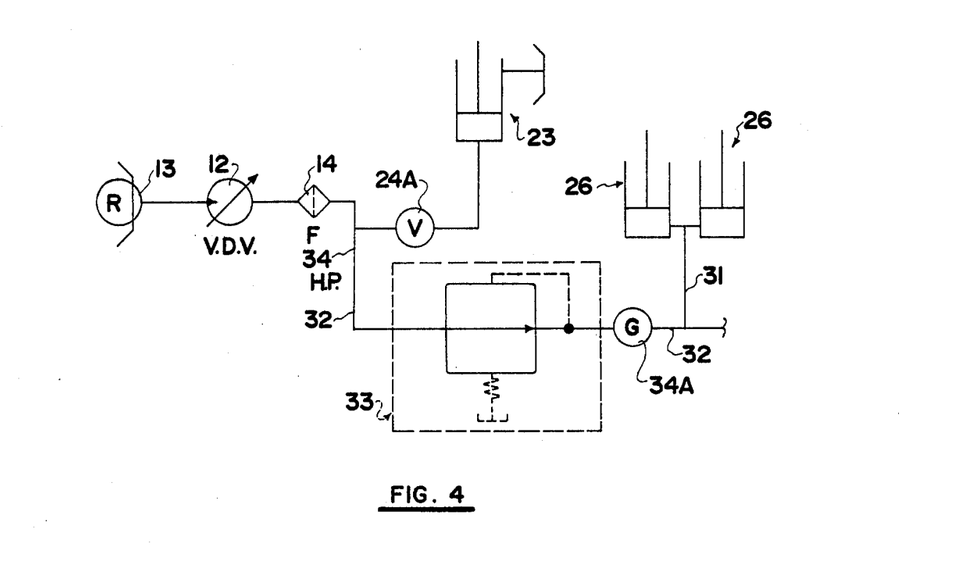
FIG. 4 is a schematic view of the hydraulic circuit.

The movement of the main hydraulic ram 23 is by means of a control valve 24A shown in the hydraulic circuit of FIG. 4.

For each disc gang, at least one link 25 is secured red to the rock shaft 21 and extends therefrom and a resetting ram assembly 26 extends between the link 25 and is operatively connected by the other end thereof to the members 16 of each disc gang 15.

If desired, a pair of rams 26 may extend between links 25 and members 16 or alternatively, cross member 27 may extend between members 16 with a single resetting ram assembly 26 extending between link 25 and the center of member 27 as shown in FIG. 2.

Resetting rams 26 are single acting rams including a cylinder 28 having a piston 29 therein secured to a piston rod 30 which in turn extends to members 16 or 27 and an hydraulic hose 31 extends from the cylinder 28 to a main hydraulic line 32 (see FIG. 1). An adjustable pressure reducing valve 33 is situated in the line 34 from the pump 12 and is adjusted to supply fluid under pressure to line 32, said fluid under pressure being registered upon gauge 34A.

This maintains a predetermined pressure within the ram cylinders 26, which are in parallel, thus fully extending the rams so that they act as a rigid link between link 25 and members 16 or 27.

This pressure reducing valve includes an adjustment which permits the operating pressure of the fluid in lines 32 and 31 and rams 26, to be adjusted within limits, to any pressure up to the pressure developed by the pump 12 and preset in the high pressure lines 34 upstream of the valve 33 so that the rams can be set to trip at the desired pressure regardless of the pressure operating ram 23.

In operation, the depth of penetration of discs 20 is controlled by valve 24A which controls the operation of the main or master ram assembly 23 and the reduced and adjusted pressure in rams 26 extends these rams to the fullest extent so that they act substantially as rigid links.

If, however, an obstruction is encountered by any one of the gangs 15, pressure builds up within ram 26 and as soon as this pressure exceeds the pressure set by the regulating valve 33, the ram will unload thus allowing the particular gang to trip or elevate until the obstruction is passed whereupon the constant pressure in line 32 will return the ram 26 to its fullest extent thus resetting the discs 20 at the predetermined depth controlled by the master cylinder assembly 23.

This enables the full pressure developed by the pump 12 (for example, approximately 800 pounds per square inch) to be utilized to hold the gangs at the required depth (for example in hard or stony ground) and to operate any other hydraulic equipment, yet enables the resetting rams 26 to be set at any desired tripping pressure below this full pressure so that chance of damage to the gangs or supporting structure is substantially reduced.

FIG. 3 shows an alternative construction such as a seed drill collectively designated 35. It consists of a frame 36 supported upon packer wheels 37 at the rear thereof and front wheels 38 at the front thereof. A seed box 39 is mounted upon frame 36 and delivers seeds to a combination seed discs and furrow opener 40 are mounted upon one end of links or members 42 pivoted to the frame 36 as at 43.

A combination main depth setting ram and resetting ram is illustrated by reference character 44 and extends between the frame 36 at point 45 and intermediate the ends of link or member 42 as illustrated by reference character 46.

Alternatively, a master cylinder (not illustrated) similar to ram 23 may control the basic setting of the seed disc and furrow opener 40 with the resetting ram 44 extending between this master cylinder and the link or member 42 and operating in a manner similar to the resetting ram 26 hereinbefore described and by means of an adjustable pressure reducing valve assembly 33.

The adjustable reset ram assembly is readily adapted for use with a hoe drill, press drill, discer or any normally spring tensioned furrow opener such as a coulter blade used on a no-till seeder. It will eliminate or reduce ridging that is caused by conventional machines and gives a relatively even depth of tillage across the width of the machine due to better penetration.

It also provides a better seed bed for the placement of seed when using a discer and will give more accurate control of depth for placing the seeds when used on a seeding machine and better control of weeds is accomplished due to the better and more even penetration achieved by the entire machine.

Figure 5:
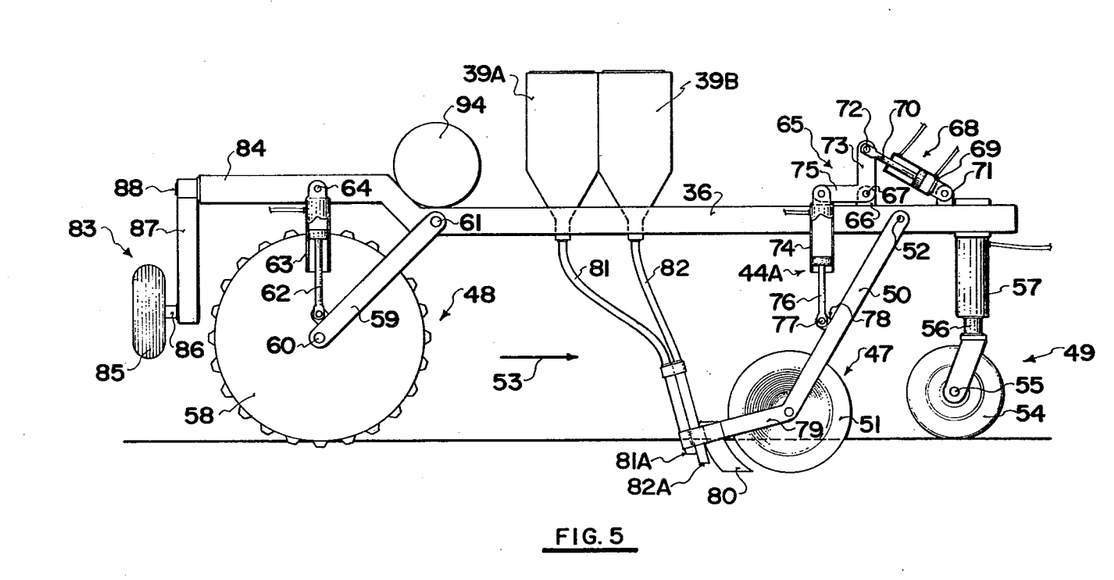
FIG. 5 is a view similar to FIG. 3 but showing an alternative structure for use as a no-till machine.
Figure 6:
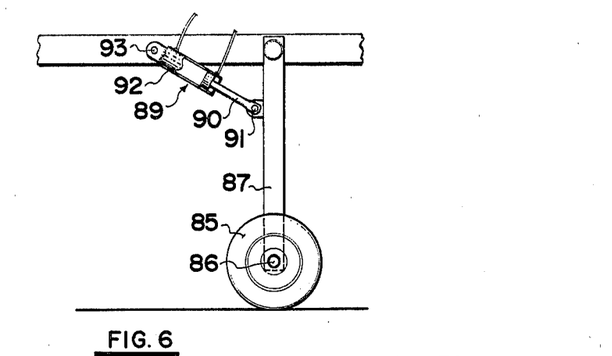
FIG. 6 is a fragmentary side view of the transport wheel at the left hand end of FIG. 5.
Figure 7:
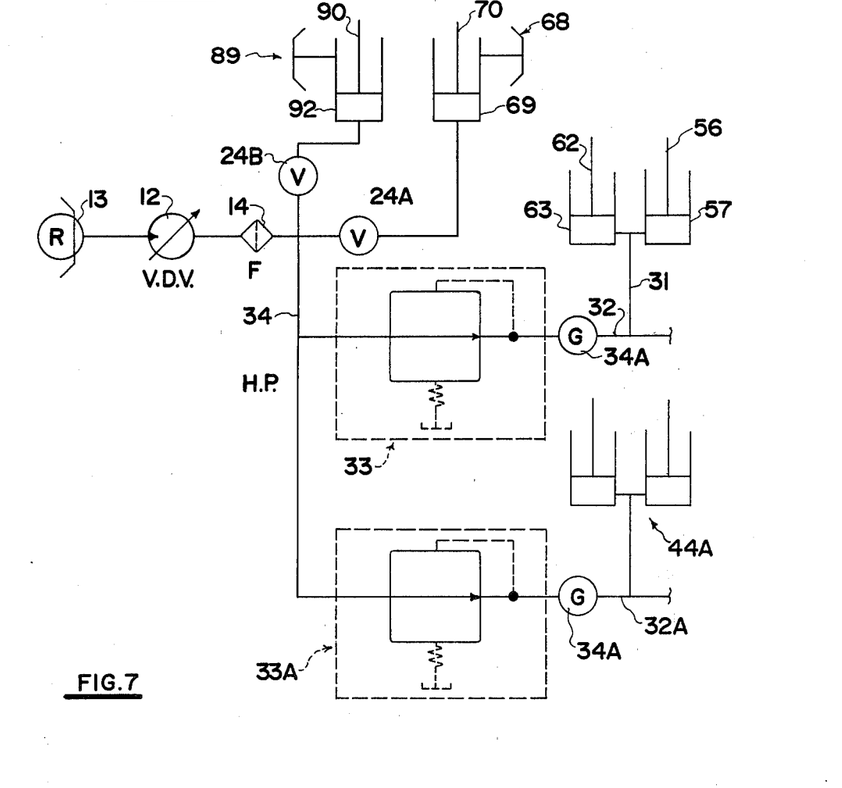
FIG. 7 is a schematic view of the hydraulic circuit as applied to FIG. 5.

FIGS. 5, 6 and 7 illustrate the invention as applied to a seed drill similar to that illustrated in FIG. 3 and in which common parts have been given similar reference characters.

It consists of the frame 36 which supports a plurality of coulter assemblies 47 in side by side relationship as is conventional in such seed drills, although only one such assembly is shown in FIG. 5.

There is a packer wheel assembly collectively designated 48 also mounted within frame 36, it being understood that there is one packer wheel assembly for each coulter assembly 47 and that the packer wheel assembly is situated in longitudinal alignment with the corresponding coulter assembly 47.

The front of the frame is supported by means of a castor wheel assembly 49, there being sufficient such castor wheel assemblies to support the front of the frame although once again, only one is illustrated in FIG. 5.

Each coulter assembly includes a member 50 in the form of an arm having a coulter cutting blade 51 journalled for rotation within the lower end thereof and with the member or arm 50 being pivotally connected by the other end thereof, to the frame 36 as indicated by pivot 52 and it will be observed that the coulter blade 51 is in trailing relationship with the pivot 52, it being understood that the machine moves in the direction of arrow 53.

Each castor wheel assembly 49 includes a castor wheel 54 journalled for rotation upon spindle 55 which in turn is mounted at the lower end of a hydraulic piston rod 56 extending from a hydraulic cylinder 57 which in turn is firmly supported adjacent the front of the frame in vertical relationship by conventional means (not illustrated).

The packer wheel assemblies 48 each include a packer wheel 58 journalled for rotation within the lower end of an arm 59, upon a spindle 60. The arm 59 is in turn supported to the frame 36 by means of a pivot 61 and once again it will be noted that the packer wheel is in trailing relationship to the arm 59.

A hydraulic piston rod 62 is pivotally secured by the distal end thereof to adjacent the lower end of arm 59 and the corresponding hydraulic cylinder 63 is in turn pivotally supported upon frame 36 as indicated by pivot 64. The hydraulic connections of the castor wheel assembly 49 and the packer assembly 48 will hereinafter be described. Suffice it to say that operation of the piston and cylinder assemblies 56/57 and 62/63, will raise and lower the frame 36 and control within limits, the penetration of the coulter blade 51 within the ground.

Reverting to the coulter assemblies 47, a crank arm collectively designated 65 is pivotally mounted intermediate the ends thereof to a bracket 66, pivot 67 mounting said crank arm. A main hydraulic ram 68 which is similar to the main hydraulic ram 23 hereinbefore described, includes a cylinder 69 and a piston rod 70. The cylinder is pivotally connected to a bracket 71 secured to the frame adjacent the mounting of cylinder 57 of the castor wheel assembly 49. The piston rod 70 is pivotally connected as by pivot pin 72, to the distal end of one arm 73 of the crank arm.

A resetting ram assembly 44A, similar to resetting ram assembly 44 and 26 hereinbefore described, includes the cylinder 74 which is pivotally connected to the distal end of the other arm 75 of the crank arm 65. The piston rod 76 of this resetting ram assembly is pivotally connected as by pivot 77 to a lug 78 secured to the arm or member 50 intermediate the ends thereof so that the assembly is similar in all respects to the structure shown in FIG. 1 insofar as function is concerned.

Reference to FIG. 7 will show the hydraulic circuit for this embodiment which is similar to the hydraulic circuit illustrated in FIG. 4.

However, it will be observed that the adjustable pressure reducing valve assembly 33 is connected to the piston and cylinder assemblies 56/57 and 62/63.

The resetting ram assembly 44A is connected to a separate adjustable pressure reducing valve assembly 33A via gauge 34A and the hydraulic pressure is set below pump pressure whereby this resetting ram assembly 44A is normally fully extended until the predetermined pressure is exceeded.

These pressure reducing valve assemblies are similar to that hereinbefore described.

Arms 79 extend rearwardly from the lower end of member or arm 50 and support a vertically situated cutting knife 80 which extends downwardly around the rear trailing periphery of the coulter blade 51 and assists in cutting through straw, weeds and the like.

Tanks 39A and 39B may carry fertilizer and seed with flexible conduits 81 and 82 extending therefrom and terminating just rearwardly of the cutting blade 80 and it will be noted that the outlet 81A is situated above the outlet 82A so that, if desired, fertilizer may be deposited at a lower level than the seed or vice-versa, depending upon circumstances.

FIGS. 5 and 6 also show a transport wheel assembly collectively designated 83 and a plurality of these are situated adjacent the rear end or side 84 of the frame 36. However, only one is shown in the drawings.

It consists of a ground engageable wheel 85 mounted for rotation upon a spindle 86 which in turn is supported upon the lower end of a transport wheel arm 87. The upper end of this arm is pivotally connected to the frame 36 by means of pivot 88 and a hydraulic piston and cylinder assembly 89 extends between the arm 87 and the frame as shown in FIG. 6. The piston rod 90 is pivotally connected to the arm 87 by means of pivot 91 and the cylinder 92 is pivotally connected to the frame by means of pivot 93.

This hydraulic ram assembly is operatively connected to the high pressure line of the hydraulic circuit in a manner similar to the main hydraulic ram assembly 68/70, it being understood that rams 68/70 and 90/92 are double acting rams.

In operation, the transport wheel 85 is raised to the position shown in FIG. 5 and the wheels 54 and 58 are adjusted so that the frame is the required height above the ground whereupon the main hydraulic ram 68/70 is actuated to force the coulter wheels 51 into the ground a sufficient depth depending upon circumstances. Under these situations, the preset rams 44A are fully extended and maintained in this fully extended position at a pressure less than the pump pressure existing in the high pressure lines 34.

If necessary, a weight shown schematically by reference character 94 may be added.

Seeding proceeds in the normal way and if an obstruction is encountered by any one of the coulter blades 51, then the ram 44A will permit the coulter assembly to raise sufficiently to clear the obstruction whereupon ram 44A will reset the coulter blade assembly.

The packer wheel assemblies 48 will close the furrow over the seed and fertilizer with weight 94 controlling or maintaining sufficient pressure of the packer assemblies upon the ground to accomplish this.

When it is desired to transport, the main hydraulic ram assembly 68/70 is retracted thus lifting the coulter assembly clear of the ground. The transport wheel assemblies 83 are lowered and the packer wheel assemblies 48 are raised so that the frame is then supported upon the castor wheel assemblies 49 and the transport wheel assemblies 83 whereupon the machine may be pulled lengthwise when the castor wheels swivelling into alignment with the transport wheels 85.

Although only one assembly is shown in FIG. 5, it will be appreciated that a plurality of coulter wheel assemblies and packer wheel assemblies are provided in spaced apart relationship one for each seed run and each one includes the individual reset cylinder assemblies 44A thus enabling same to absorb any shock through rocks or the like that the coulter wheels encounter. It also maintains a proper penetration force for the coulter wheels.

The positioning of the packer wheel assemblies 48 and the castor wheel assemblies 49 through their individual piston and cylinder assemblies, will increase and decrease the depth penetration of the coulter assemblies 47 and the pressure reducing valve 33 may be regulated automatically and, if desired, the piston and cylinder assemblies 56/57 and 62/63 may be directly coupled to a conventional electrohydraulic control valve (not illustrated) which automatically exerts or decreases pressure to permit uniform depth to the coulter wheel assemblies. This can be monitored by a direct reading of a wheel placed between the frame 36 and the ground and is conventional with the increase and decrease in depth adjustment being adjustable initially by the double acting cylinder 68/70.

The advantage of utilizing the hydraulic reset piston and cylinder assemblies 44A are similar to that hereinbefore described for the previous embodiment dealing with the disc gangs, it being understood that conventional no-till machines available at present have to utilize an extremely tight spring tensioned member in order to maintain the depth of penetration on the coulter assembly thus leading to breakage of frame or support members 50 if the coulter blades hit rocks and the like.

It should be noted that although the resetting rams 44 and 44A are shown and described as normally being fully extended, it will be appreciated that, by re-arranging the linkage connection so that, for example, the rams are underslung, they could normally be fully retracted and held in this position by fluid under pressure upon the offset or piston rod side of the piston. The fluid pressure would be adjustable by pressure reducing valves 33 and 33A respectively. In at least some of the attached claims therefore, the fully extended or fully retracted position mentioned are defined as the ram assemblies being normally fully at one end of the stroke thereof with a predetermined pressure upon said ground engaging tool assembly is exceeded.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. In an agricultural implement which includes a frame, and a ground engaging tool assembly pivotally supported upon said frame, an hydraulic system including a variable displacement pump, a high pressure line extending from said pump, a main hydraulic ram operatively connected to said high pressure line and to said ground engaging tool assembly for controlling and presetting the depth of penetration of said ground engaging tool assembly; the improvement comprising in combination a resetting ram assembly for said ground engaging tool assembly, operatively extending between said ground engaging tool assembly and said frames, means operatively connecting said resetting ram assembly to the hydraulic system and means to adjust the hydraulic pressure within said resetting ram assembly below pump pressure whereby said resetting ram assembly is normally fully at one end of the stroke thereof until a predetermined pressure upon said ground engaging tool assembly is exceeded, said last mentioned means comprising a pressure reducing valve assembly operatively connected between said high pressure line and said resetting ram assembly to conrol and sense the pressure downstream of said valve assembly, said ground engaging tool assembly including at least one coulter assembly mounted for pivotal action to said frame, said resetting ram assembly being operatively connected between said main hydraulic ram and said coulter assembly.

2. The improvement according to claim 1 in which said ground engaging tool assembly includes a member pivoted by one end thereof to said frame, said coulter assembly being operatively mounted upon the other end of said member, said resetting ram assembly being operatively connected to said member intermediate the ends thereof.

3. The improvememt according to claim 1 which includes a crank arm pivotally mounted intermediate the ends thereof to said frame, said main hydraulic ram being operatively connected between one end of said crank arm and said frame, said resetting ram assembly being operatively connected between the other end of said crank arm and said coulter assembly.

4. The improvement according to claim 2 which includes a crank arm pivotally mounted intermediate the ends thereof to said frame, and said hydraulic ram being operatively connected between one end of said crank arm and said frame, said resetting ram assembly being operatively connected between the other end of said crank arm and said member.

5. The improvement according to claim 1 in which said coulter assembly includes a cutting knife mounted to said coulter assembly and immediately behind same and depending downwardly from the rear end thereof, to cut through straw, weeds and the like, and seed and fertilizer depositing spouts supported by said coulter assembly behind said cutting knife.

6. The improvement according to claim 2 in which said coulter assembly includes a coulter wheel journalled for rotation at said other end of said member, a cutting knife mounted to said member immediately behind said coulter wheel to cut through straw, weeds and the like, and seed and fertilizer depositing spouts supported by said coulter assembly behind said cutting knife.

7. The improvement according to claim 3 in which said coulter assembly includes a cutting knife mounted to said coulter assembly and immediately behind same and depending downwardly from the rear end thereof, to cut through straw, weeds and the like, and seed and fertilizer depositing spouts supported by said coulter assembly behind said cutting knife.

8. The improvement according to claim 4 in which said coulter assembly includes a coulter wheel journalled for rotation at said other end of said member, a cutting knife mounted to said member immediately behind said coulter wheel to cut through straw, weeds and the like, and seed and fertilizer depositing spouts supported by said coulter assembly behind said cutting knife.

9. The improvement according to claim 1 which includes at least one front castor wheel assembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and said cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

10. The improvement according to claim 2 which includes at least one front castor wheel assembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

11. The improvement according to claim 3 which includes at leat one front castor wheel assembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

12. The improvement according to claim 4 which includes at least one front castor wheel assembly supporting said frame forwardly of said coulter assembly and a packer wheel assembly depeonding from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

13. The improvement according tl claim 5 which includes at least one front castor wheel asembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

14. The improvement according to claim 6 which includes at least one front castor wheel assembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

15. The improvement according to claim 7 which includes at least one front castor wheel assembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

16. The improvement according to claim 8 which includes at least one front castor wheel assembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and sai frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, a packer wheel operatively mounted on the other end of said arm, said hydraulic piston and cylinder assembly for said packer wheel assembly operatively extending between said frame and said arm.

17. The improvement according to claims 1, 2 or 3 which includes at least one transport wheel assembly mounted adjacent the rear side of said frame, said transport wheel assembly including a transport wheel arm pivoted by one end thereof to said frame, a wheel mounted upon the other end of said transport wheel arm and being journalled for rotation therein, and a hydraulic piston and cylinder assembly operatively extending between said frame and said transport wheel arm for raising and lowering same, and a further resetting ram assembly for said last mentioned piston and cylinder assembly operatively connected thereto.

18. The improvement according to claims 4, 5 or 6 which includes at least one transport wheel assembly mounted adjacent the rear side of said frame, said transport wheel assembly including a transport wheel arm pivoted by one end thereof to said frame, a wheel mounted upon the other end of said transport wheel arm and being journalled for rotation therein, and a hydraulic piston and cylinder assembly operatively extending between said frame and said transport wheel arm for raising and lowering same, and a further resetting ram assembly for said last mentioned piston and cylinder assembly operatively connected thereto.

19. The improvement according to claims 7, 8 or 9 which includes at least one transport wheel assembly mounted adjacent the rear side of said frame, said transport wheel assembly including a transport wheel arm pivoted by one end thereof to said frame, a wheel mounted upon the other end of said transport wheel arm and being journalled for rotation therein, and a hydraulic piston and cylinder assembly operatively extending between said frame and said transport wheel arm for raising and lowering same, and a further resetting ram assembly for said last mentioned piston and cylinder assembly operatively connected thereto.

20. The improvement according to claims 10, 11 or 12 which includes at least one transport wheel assembly mounted adjacent the rear side of said frame, said transport wheel assembly including a transport wheel arm pivoted by one end thereof to said frame, a wheel mounted upon the other end of said transport wheel arm and being journalled for rotation therein, and a hydraulic piston and cylinder assembly operatively extending between said frame and said transport wheel arm for raising and lowering same, and a further resetting ram assembly for said last mentioned piston and cylinder assembly operatively connected thereto.

21. The improvement according to claims 13, 14 or 15 which includes at least one transport wheel assembly mounted adjacent the rear side of said frame, said transport wheel assembly including a transport wheel arm pivoted by one end thereof to said frame, a wheel mounted upon the other end of said transport wheel arm and being journalled for rotation therein, and a hydraulic piston and cylinder assembly operatively extending between said frame and said transport wheel arm for raising and lowering same, and a further resetting ram assembly for said last mentioned piston and cylinder assembly operatively connected thereto.

22. The improvement according to claim 16 which includes at least one transport wheel assembly mounted adjacent the rear side of said frame, said transport wheel assembly including a transport wheel arm pivoted by one end thereof to said frame, a wheel mounted upon the other end of said transport wheel arm and being journalled for rotation therein, and a hydraulic piston and cylinder assembly operatively extending between said frame and said transport wheel arm for raising and lowering same, and a further resetting ram assembly for said last mentioned piston and cylinder assembly operatively connected thereto.

23. A ground working agricultural implement comprising in combination a frame, a ground engaging tool assembly pivotally supported upon said frame, an hydraulic system including a variable displacement pump, a high pressure line extending from said pump, a main hydraulic ram operatively connected to said high pressure line and to said ground engaging tool assembly for controlling and presetting the depth of penetration of said ground engaging tool assembly; the improvement comprising in combination a resetting ram assembly for said ground engaging tool assembly, operatively extending between said gound engaging tool assembly and said frame, means operatively connecting said resetting ram assembly to the hydraulic system and means to adjust the hydraulic pressure within said resetting ram assembly below pump pressure whereby said resetting ram assembly is normally fully extended until a predetermined pressure upon said ground engaging tool assembly is exceeded, said last mentioned means comprising a pressure reducing valve assembly operatively connected between said high pressure line and said resetting ram assembly to control and sense the pressure downstream of said valve assembly, said ground engaging tool assembly including at least one coulter assembly mounted for pivotal action to said frame, said resetting ram assembly being operatively connected between said main hydraulic ram and said coulter assembly.

24. The ground working implement according to claim 23 in which said ground engaging tool assembly includes a member pivoted by one end thereof to said frame, said coulter assembly being operatively mounted upon the other end of said member, said resetting ram assembly being operatively connected to said member intermediate the ends thereof.

25. The ground working implement according to claim 23 which includes a crank arm pivotally mounted intermediate the ends thereof to said frame, said main hydraulic ram being operatively connected between one end of said crank arm and said frame, said resetting ram assembly being operatively connected between the other end of said crank arm and said coulter assembly.

26. The ground working implement according to claim 24 which includes a crank arm pivotally mounted intermediate the ends thereof to said frame, said main hydraulic ram being operatively connected between one end of said crank arm and said frame, said resetting ram assembly being opertively connected between the other end of said crank arm and said coulter assembly.

27. The ground working implement according to claim 23 in which said coulter assembly includes a cutting knife mounted to said coulter assembly and immediately behind same and depending downwardly from the rear end thereof, to cut through straw, weeds and the like, and seed and fertilizer depositing spouts supported by said coulter assembly behind said cutting knife.

28. The ground working implement according to claim 23 which includes at least one front castor wheel assembly supporting said frame forwardly of said coulter assembly and a packer wheel assembly depending from said frame behind said coulter assembly and in longitudinal alignment therewith, and supporting said frame rearwardly of said coulter assembly, hydraulic piston and cylinder means operatively extending between said castor wheel and said frame, further hydraulic piston and cylinder means operatively extending between said packer wheel assembly and said frame, and a further resetting ram assembly for said last mentioned hydraulic piston and cylinder assemblies operatively connected thereto, said packer wheel assembly including an arm pivoted by one end thereof to said frame, packer wheel operatively mounted on the other end of said arm, said hydraulic piston and cylinder assembly for said packer wheel assembly operatively extending between said frame and said arm.

* * * * *